United States Patent
Fan et al.

(10) Patent No.: US 12,441,468 B2
(45) Date of Patent: Oct. 14, 2025

(54) BIO-INSPIRED FLAPPING WING/FIN ROBOTIC PLATFORM

(71) Applicant: Brown University, Providence, RI (US)

(72) Inventors: Xiaozhou Fan, Pasadena, CA (US); Kenneth Breuer, Newton, MA (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 18/514,625

(22) Filed: Nov. 20, 2023

(65) Prior Publication Data

US 2024/0166347 A1    May 23, 2024

Related U.S. Application Data

(60) Provisional application No. 63/384,357, filed on Nov. 18, 2022.

(51) Int. Cl.
*B64C 33/02* (2006.01)

(52) U.S. Cl.
CPC .................... *B64C 33/02* (2013.01)

(58) Field of Classification Search
CPC ........ B64C 33/02; B64C 33/025; B64U 10/40
See application file for complete search history.

(56) References Cited

U.S. PATENT DOCUMENTS

| | | |
|---|---|---|
| 2,562,227 A | 7/1951 | Wilhelm |
| 2,739,770 A | 3/1956 | Fanti et al. |
| 3,092,354 A | 6/1963 | Alberto |
| 3,140,065 A | 7/1964 | Alberto |
| 3,162,402 A | 12/1964 | Alberto |
| 3,179,354 A | 4/1965 | Alberto |
| 3,635,590 A | 1/1972 | Phillips |
| 3,945,590 A * | 3/1976 | Kennedy, Jr. ........ G05D 1/0661 244/181 |
| 4,434,957 A | 3/1984 | Moritz |
| 4,606,519 A | 8/1986 | Fertis et al. |
| 4,641,796 A | 2/1987 | Feifel |
| 4,692,098 A | 9/1987 | Razinsky et al. |
| 4,890,803 A | 1/1990 | Smith |
| 5,322,246 A | 6/1994 | Henne et al. |
| 5,687,934 A | 11/1997 | Owens |
| 5,772,156 A | 6/1998 | Parikh et al. |
| 8,251,317 B2 | 8/2012 | Pitt |

(Continued)

FOREIGN PATENT DOCUMENTS

| | | |
|---|---|---|
| CN | 111994266 A | 11/2020 |
| CN | 113492974 A | 10/2021 |

(Continued)

OTHER PUBLICATIONS

J. Deitl and E. Garcia. Ornithopter optimal trajectory control, Apr. 13, 2012 Aerospace Science and Technology. (Year: 2012).*

(Continued)

*Primary Examiner* — Joshua D Huson
*Assistant Examiner* — Peter A Taraschi
(74) *Attorney, Agent, or Firm* — Banner & Witcoff, Ltd.

(57) ABSTRACT

A three degrees-of freedom robotic flapper includes a fuselage, the fuselage housing motors and driving trains, a left wing attached to the fuselage, and a right wing attached to the fuselage, the left wing and the right wing configured to perform a wing flapping motion, a wing twisting motion and a wing folding motion.

18 Claims, 11 Drawing Sheets

(56) References Cited

U.S. PATENT DOCUMENTS

| | | | |
|---|---|---|---|
| 8,991,768 | B1 | 3/2015 | Chase et al. |
| 9,216,823 | B2 | 12/2015 | Matte |
| 9,428,269 | B1* | 8/2016 | Oppenheimer ....... B64C 33/025 |
| 10,814,975 | B1 | 10/2020 | Zongker |
| 11,426,668 | B1* | 8/2022 | Reiner ................. A63H 7/00 |
| 2002/0173217 | A1 | 11/2002 | Kinkade |
| 2009/0230235 | A1 | 9/2009 | McNulty |
| 2009/0294596 | A1 | 12/2009 | Sinha et al. |
| 2013/0056585 | A1 | 3/2013 | Llamas |
| 2014/0119934 | A1 | 5/2014 | Huynh et al. |
| 2014/0263826 | A1* | 9/2014 | Matte ................... A63H 27/008 244/72 |
| 2015/0122942 | A1 | 5/2015 | Hirvinen et al. |
| 2015/0217851 | A1 | 8/2015 | Kelso |
| 2017/0137116 | A1 | 5/2017 | Ireland et al. |
| 2017/0241278 | A1 | 8/2017 | Paruchuri et al. |
| 2019/0128123 | A1 | 5/2019 | Paruchuri et al. |
| 2020/0023945 | A1 | 1/2020 | Nizov |
| 2020/0102064 | A1 | 4/2020 | Di Luca et al. |
| 2021/0284328 | A1 | 9/2021 | Donaldson et al. |
| 2022/0289358 | A1 | 9/2022 | Weissberg et al. |
| 2022/0380038 | A1* | 12/2022 | Ramezani ............... B64C 33/02 |

FOREIGN PATENT DOCUMENTS

| | | |
|---|---|---|
| CN | 113619780 A | 11/2021 |
| CN | 108945430 B | 4/2022 |
| CN | 110155321 B | 4/2022 |
| CN | 114560084 A | 5/2022 |
| CN | 112173101 B | 7/2022 |
| CN | 114735211 A | 7/2022 |
| CN | 112478155 B | 8/2022 |
| CN | 217170962 U | 8/2022 |
| CN | 217396808 U | 9/2022 |
| CN | 115196013 A | 10/2022 |
| CN | 115214882 A | 10/2022 |
| DE | 102008061838 A1 | 6/2010 |
| DE | 102013013667 A1 | 2/2015 |
| GB | 2547933 A | 9/2017 |
| JP | 2008273270 A | 11/2008 |
| KR | 100580962 B1 | 5/2006 |
| WO | 2009098442 A2 | 8/2009 |
| WO | 2010115815 A2 | 10/2010 |
| WO | 2011149440 A2 | 12/2011 |

OTHER PUBLICATIONS

Wygnanski, et al., "Active Flow Control on Hurley's Free-Streamline Airfoil and Delta", Arizona University Tucson Dept of Aerospace and Mechanical Engineering, 1999, 21 pages.

Ozalp, et al., "Experimental Measurement of Flow Past Cavities of Different Shapes", Experimental Thermal and Fluid Science, vol. 34, 2010, pp. 505-515.

Perrotta, et al., "Velocity Field Measurements of the California Sea Lion Propulsive Stroke Using Bubble PIV", Fluids, vol. 7, No. 3, 2022, 11 pages.

Qin, et al., "On the controlled evolution for wingtip vortices of a flapping wing model at bird scale", Aerospace Science and Technology, vol. 110, 2021, 10 pages.

Radespiel, et al., "Active Flow Control for High Lift with Steady Blowing", The Aeronautical Journal, vol. 120, No. 1223, Jan. 2016, pp. 171-200.

Riskin, et al., "Quantifying the complexity of bat wing kinematics", Journal of Theoretical Biology, vol. 254, Issue 3, 2008, pp. 604-615.

Riskin, et al., "Upstroke wing flexion and the inertial cost of bat flight", Proceedings of the Royal Society B: Biological Sciences, vol. 279, Issue 1740, 2012, pp. 2945-2950.

Sane, et al., "The aerodynamic effects of wing rotation and a revised quasi-steady model of flapping flight", The Journal of Experimental Biology, vol. 205, 2002, pp. 1087-1096.

Santhanakrishnan, et al., "Enabling Flow Control Technology for Low Speed UAVs", American Institute of Aeronautics and Astronautics, Sep. 2005, pp. 1-13.

Savitzky, et al., "Smoothing and Differentiation of Data by Simplified Least Squares Procedures", Analytical Chemistry, vol. 36, Issue 8, 1964, pp. 1627-1639.

Schumacher, et al., "The Effect of a Cavity on Airfoil Tones", Journal of Sound and Vibration, vol. 333, No. 7, 2014, pp. 1913-1931.

Sekhar, et al., "Canonical description of wing kinematics and dynamics for a straight flying insectivorous bat (*Hipposideros pratti*)", Plos One, 2019, 19 pages.

Send, et al., "Artificial hinged-wing bird with active torsion and partially linear kinematics", 28th Congress of the International Council of the Aeronautical Sciences, 2012, pp. 23-28.

Shmilovich, et al., "Active Flow Control for Practical High-Lift Systems", Journal of Aircraft, vol. 46, No. 4, Jul.-Aug. 2009, pp. 1354-1364.

Shmilovich, et al., "Flow Control for the Systematic Buildup of High-Lift Systems", Journal of Aircraft, vol. 45, No. 5, Sep.-Oct. 2008, pp. 1680-1688.

Shmilovich, et al., "Flow Control Techniques for Transport Aircraft", American Institute of Aeronautics and Astronautics, vol. 49, No. 3, Mar. 2011, pp. 489-502.

Spedding, et al., "Momentum and Energy in the Wake of a Pigeon (Columba Livia) in Slow Flight", The Journal of Experimental Biology, vol. 111, Issue 1, 1984, pp. 81-102.

Stowers, et al., "Folding in and out: passive morphing in flapping wings", Bioinspiration & Biomimetics, vol. 10, No. 2, 2015, 17 pages.

Taha, et al., "State-space representation of the unsteady aerodynamics of flapping flight", Aerospace Science and Technology, vol. 34, 2014, pp. 1-11.

Taylor, et al., "Dynamic flight stability in the desert locust *Schistocerca gregaria*", The Journal of Experimental Biology, vol. 206, No. 16, 2003, pp. 2803-2829.

Taylor, et al., "Flying and swimming animals cruise at a Strouhal number tuned for high power efficiency", Nature, vol. 425, 2003, pp. 707-711.

Usherwood, James R., "The aerodynamic forces and pressure distribution of a revolving pigeon wing", Exp Fluids, vol. 46 Number 5, 2009, pp. 991-1003.

Vejdani, et al., "Robustness analysis of minimally-actuated flapping wing systems due to aerodynamic modeling uncertainty", IEEE/ASME International Conference on Advanced Intelligent Mechatronics (AIM), 2022, pp. 670-676.

Vejdani, et al., "The dynamics of hovering flight in hummingbirds, insects and bats with implications for aerial robotics", Bioinspiration & Biomimetics, vol. 14, 2018, 31 pages.

Vuddagiri, et al., "Vortex Trapping by Different Cavities on an Airfoil", Wind Engineering, vol. 37, No. 5, 2013, pp. 469-482.

Wang, Xincheng, "Bat Flight Inspired Flapping Wing Robots Design", Biomechanics in the Wild, 2022, 4 pages.

Wang, et al., "Unsteady forces and flows in low Reynolds number hovering flight: Two-dimensional computations vs robotic wing experiments", The Journal of Experimental Biology, vol. 207, 2004, pp. 449-460.

Weis-Fogh, et al., "Quick Estimates of Flight Fitness in Hovering Animals, Including Novel Mechanisms for Lift Production", Journal of Experimental Biology, vol. 59, Issue 1, 1973, pp. 169-230.

Windes, et al., "A computational investigation of lift generation and power expenditure of Pratt's roundleaf bat (*Hipposideros pratti*) in forward flight", Plos One, vol. 13, 2018, 17 pages.

Wissa, et al., "Passively morphing ornithopter wings constructed using a novel compliant spine: design and testing", Smart Materials and Structures, vol. 21, No. 9, 2012, 10 pages.

Fan, et al., "Wing twist and folding work in synergy to propel flapping wing animals and robots", Center for Fluid Mechanics, 7 pages.

Bahlman, et al., "Design and characterization of a multi-articulated robotic bat wing", Bioinspiration & Biomimetics, vol. 8, No. 1, 2013, 18 pages.

Bahlman, et al., "How wing kinematics affect power requirements and aerodynamic force production in a robotic bat wing", Bioinspiration & Biomimetics, vol. 9, No. 2, 2014, 11 pages.

(56) References Cited

OTHER PUBLICATIONS

Bie, et al., "Analytical Study on Lift Performance of a Bat-Inspired Foldable Flapping Wing: Effect of Wing Arrangement", Aerospace, vol. 9, No. 11, 2022, 19 pages.
Bie, et al., "Design, aerodynamic analysis and test flight of a bat-inspired tailless flapping wing unmanned aerial vehicle", Aerospace Science and Technology, vol. 112, 2021, 10 pages.
Bohl, et al., "MTV measurements of the vortical field in the wake of an airfoil oscillating at high reduced frequency", Journal of Fluid Mechanics, vol. 620, 2009, pp. 63-88.
Boonman, et al., "Nonecholocating Fruit Bats Produce Biosonar Clicks with Their Wings", Current Biology, vol. 24, Issue 24, 2014, pp. 2962-2967.
Breuer, et al., "Design and performance of an ultra-compact low-speed 571 low-turbulence level wind tunnel for aerodynamic and animal flight experiments", Experiments in Fluids, vol. 63, Article 169, 2022, 13 pages.
Bunyakin, et al., "High-Reynolds-number Batchelor-model asymptotics of a flow past an aerofoil with a vortex trapped in a cavity", J. Fluid Mech., vol. 358, 1998, pp. 283-297.
Chang, et al., "An unconventional mechanism of lift production during the downstroke in a hovering bird (Zosterops japonicus)", Experiments in Fluids, vol. 51, No. 5, 2011, pp. 1231-1243.
Chang, et al., "Ventral-clap modes of hovering passerines", Physical Review E 87, Feb. 27, 2007, 2013, 11 pages.
Chen, et al., "A Review of Design and Fabrication of the Bionic Flapping Wing Micro Air Vehicles", Micromachines, vol. 10, No. 144, 2019, 20 pages.
Chen, et al., "Aerodynamic effects on an emulated hovering passerine with different wing-folding amplitudes", Bioinspiration & Biomimetics, vol. 16, No. 4, 2021, 14 pages.
Costello, et al., "The Hydrodynamics of Jellyfish Swimming", Annual Review of Marine Science, 2020, pp. 375-396.
Crandell, et al., "Kinematics and aerodynamics of avian upstrokes during slow flight", The Journal of Experimental Biology, vol. 218, 2015, pp. 2518-2527.
Daley, et al., "Running stability is enhanced by a proximo-distal gradient in joint neuromechanical control", Journal of Experimental Biology, vol. 210, Issue 3, 2007, pp. 383-394.
Doncieux, et al., "Evolutionary Algorithms to Analyse and Design a Controller for a Flapping Wings Aircraft", New Horizons in Evolutionary Robotics, 2011, pp. 1-18.
Ellington, C. P., "The aerodynamics of hovering insect flight. I. The quasi-steady analysis", Philosophical Transactions of the Royal Society of London. Series B, Biological Sciences, vol. 305, No. 1122, 1984, pp. 1-15.
Fan, et al., "Low-Order Modeling of Flapping Flight with Highly Articulated, Cambered, Heavy Wings", AIAAJ., 2021, pp. 1-10.
Fan, et al., "Power requirements for bat-inspired flapping flight with heavy, highly articulated and cambered wings", Journal of The Royal Society Interface, vol. 19, Issue 194, 2022, 13 pages.
Fan, et al., "Wing Fold and Twist Greatly Improves Flight Efficiency for Bat-Scale Flapping Wing Robots", International Conference on Intelligent Robots and Systems, 2021, 7 pages.
Feshalami, et al., "Experimental investigation of flapping mechanism of the black-headed gull in forward flight", Proceedings of the Institution of Mechanical Engineers, Part G: Journal of Aerospace Engineering, vol. 233, Issue 12, 2018, pp. 4333-4349.
Gould, et al., "Wing-Clapping Sounds of Eonycteris spelaea (Pteropodidae) in Malaysia", Journal of Mammalogy, vol. 69, Issue 2, 1988, pp. 378-379.
Haddabi, et al., "The Impact of Steady Blowing from the Leading Edge of an Open Cavity Flow", Aerospace, vol. 8, No. 255, Sep. 9, 2021, 22 pages.
Hamid, et al., "Passive Control of Shock Oscillation Around a Biconvex Circular Arc Airfoil in a Channel", Procedia Engineering, Dec. 2014, 7 pages.
Hedenstrom, et al., "Bat flight generates complex aerodynamic tracks", Science, vol. 316, Issue 5826, 2007, pp. 894-897.
Hedrick, Tyson L., "Software techniques for two- and three-dimensional kinematic measurements of biological and biomimetic systems", Bioinspiration & Biomimetics, vol. 3, No. 3, 2008, 7 pages.
Hedrick, et al., "Wing inertia and whole-body acceleration: An analysis of instantaneous aerodynamic force production in cockatiels (Nymphicus hollandicus) flying across a range of speeds", Journal of Experimental Biology, vol. 207, Issue 10, 2004, pp. 1689-1702.
Huang, Mingyang, "Optimization of flapping wing mechanism of bionic eagle", Proceedings of the Institution of Mechanical Engineers, Part G: Journal of Aerospace Engineering, 2018, 13 pages.
Hubel, et al., "Wake structure and kinematics in two insectivorous bats", Philosophical Transactions of the Royal Society B: Biological Sciences, vol. 371, Issue 1704, 2016, 12 pages.
Hubel, et al., "Wake structure and wing kinematics: the flight of the lesser dog-faced fruit bat, Cynopterus brachyotis", The Journal of Experimental Biology, vol. 213, Issue 20, 2010, pp. 3427-3440.
Hurley, D. G., "The Use of Boundary-Layer Control to Establish Free Stream-Line Flows", Advances in Aeronautical Sciences, 1959, pp. 662-708.
Johansson, et al., "Butterflies fly using efficient propulsive clap mechanism owing to flexible wings", Journal of The Royal Society Interface vol. 18, Issue 174, 2021, 10 pages.
Kashi, et al., "Flowfields produced by a robotic sea lion foreflipper starting from rest", Bioinspiriration & Biomimetics, vol. 15, 2020, 8 pages.
Kuchan, Abigail, "The Integration of Active Flow Control Devices into Composite Wing Flaps", Georgia Institute of Technology, Aug. 2012, 180 pages.
Laitone, E V, "Wind Tunnel Tests of Wings at Reynolds Numbers Below 70000", Experiments in Fluids, vol. 23, 1997, pp. 405-409.
Lam, et al., "Aeroacoustics of NACA 0018 Airfoil with a Cavity", AIAA Journal, vol. 56, No. 12, Dec. 2018, pp. 4775-4786.
Lang, et al., "Effect of spanwise folding on the aerodynamic performance of three dimensional flapping flat wing", Physics of Fluids, vol. 34, Issue 2, 2022, 8 pages.
Lehmann, et al., "The aerodynamic effects of wing-wing interaction in flapping insect wings", The Journal of Experimental Biology, vol. 208, 2005, pp. 3075-3092.
Liao, et al., "Mechanical design and dynamics system identification of two-section Flapping Wing Aircraft", IOP Conference Series: Materials Science and Engineering, vol. 563, Issue 3, 2019, 10 pages.
Luca, et al., "A Bioinspired Separated Flow Wing Provides Turbulence Resilience and Aerodynamic Efficiency for Miniature Drones", Science Robotics, vol. 5, 2020, eaay8533, 9 pages.
Luca, et al., "Cavities Improve the Power Factor of Low Reynolds Numbers Airfoils and Wings", AIAA Journal, Article in Advance, 2021, 12 pages.
Luca, et al., "Steady Blowing to Control the Lift and Drag on a Free Shear Layer Airfoil", AIAA SciTech Forum, Jan. 7-11, 2019, 11 pages.
McArthur, John, "Aerodynamics of Wings at Low Reynolds Numbers", Aerospace and Mechanical Engineering, Jul. 2007, 80 pages.
McMasters, et al., "Low-Speed Single-Element Airfoil Synthesis", Technical Soaring, vol. VI, No. 2, Mar. 1979, 21 pages.
Muijres, et al., "Leading edge vortices in lesser long-nosed bats occurring at slow but not fast flight speeds", Bioinspiration & Biomimetics, vol. 9, No. 2, 2014, 10 pages.
Muijres, et al., "Leading-Edge Vortex Improves Lift in Slow-Flying Bats", Science 319, 2006, pp. 1250-1253.
Muramatsu, et al., "Oceanic squid do fly", Marine in Biology, vol. 160, 2013, pp. 1171-1175.
Nguyen, et al., "Design, Fabrication, and Performance Test of a Hovering-Based Flapping-Wing Micro Air Vehicle Capable of Sustained and Controlled Flight", Conference: 2014 International Micro Air Vehicle Conference and Competition, 2014, pp. 18-25.
Olsman, et al., "Numerical Simulation of Flow over an Airfoil with a Cavity", AIAA Journal vol. 49 No. 1, 2011, pp. 143-149.

(56) References Cited

OTHER PUBLICATIONS

Onoue, et al., "Vortex formation and shedding from a cyber-physical pitching plate", Journal of Fluid Mechanics, vol. 793, 2016, pp. 229-247.

* cited by examiner

BIO-INSPIRED FLAPPING WING/FIN ROBOTIC PLATFORM

CROSS-REFERENCE TO RELATED APPLICATION(S)

The present application claims priority benefit of U.S. Provisional Application No. 63/384,357, filed Nov. 18, 2022, which is herein incorporated by reference in its entirety.

BACKGROUND OF THE INVENTION

The present invention relates generally to drones, and more particularly to a bio-inspired flapping wing/fin robotic platform.

Drones and other small aircraft have been of great interest in the last few years. Many drones or small aircraft have been in development for use in a number of different industries including surveillance, product delivery, real estate, personnel transport, and entertainment. Many developers have included designs that include multiple rotors that can generate lift and thrust to propel an aircraft. Additionally, some manufactures have incorporated various other components to help improve the overall flight characteristics, including fixed wings and/or control surfaces. In some ways, manufactures can be limited in the overall design of an aircraft by the types of maneuvers desired as well as the potential for payload. The change in design and/or payload can affect the respective aerodynamic forces that contribute to the flight of the aircraft and thus lead to additional rotors or control surfaces to help maintain the desired flight characteristics.

Despite the advancements in such aircraft, many manufactures continue to use more traditional designs of control surfaces on fixed wings as well as the addition of more rotors or propellers to help compensate for aerodynamic forces that affect the control of the aircraft when subject to different load patterns.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a three degrees-of freedom robotic flapper including a fuselage, the fuselage housing motors and driving trains, a left wing attached to the fuselage, and a right wing attached to the fuselage, the left wing and the right wing configured to perform a wing flapping motion, a wing twisting motion and a wing folding motion.

In another aspect, the invention features a method of flapping wings on a robotic platform including providing a fuselage housing motors and driving trains, providing a left wing attached to the fuselage, providing a right wing attached to the fuselage, and performing a wing flapping motion, a wing twisting motion and a wing folding motion, wherein the wing folding motion and the wing twisting work in synergy by alleviating negative lift during a late upstroke, and producing more thrust in a throughout cycle.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF DRAWINGS

These and other features, aspects, and advantages of the present invention will become better understood with reference to the following description, appended claims, and accompanying drawings where:

Like reference symbols in the various drawings indicate like elements.

DETAILED DESCRIPTION OF THE PREFERRED EMBODIMENT(S)

It is to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Wing articulation is critical for efficient flight of bird- and bat-sized animals. Inspired by the flight of *Cynopterus brachyotis*, the lesser short-nosed fruit bat, the present invention is an unmanned aircraft, drones formally known as an unmanned aerial vehicle (UAV) or unmanned aircraft system, which can be remotely controlled or fly autonomously using software-controlled flight plans in its embedded systems, that work in conjunction with onboard sensors and a global positioning system (GPS). Here, the UAV is built with a three-degree-of-freedom flapping wing platform with variable wing folding capability. At the extreme in upstroke, its wings "clap" and produce an air jet that increases lift production. We found that lift and power economy (ratio of lift/power) increase with increases in wing folding, demonstrating that wing folding is an efficient kinematic choice to increase lift or payloads. Power economy peaks at moderate wing folding angles, which suggests there may not be a single optimum wing folding pattern for across all flight speeds. Flapping wing robots can incorporate this clapping based jet propulsion in their design, which, during upstroke, yields peak positive force matched to lift in downstroke, thus providing a mechanism for extra lift needed in maneuvering or acrobatic flight.

Bats fly with highly-articulated wings, especially the kinematics of the handwing, from the wrist to the wing tip, vary significantly with flight speed. During upstroke, in addition to wing elevation, bats' wrists flex, which rotates the handwing with respect to the armwing about a chordwise axis through the wrist, and fold the wings. The folding reduces the inertial power of wing elevation, and the reduced wing wetted surface area due to folding leads to a decrease in negative lift. During late downstroke, due to wing folding, the additional angular velocity of the handwing increases its effective angle of attack and effective velocity, which contribute to greater lift. It is therefore no surprise that bio-inspired robotic flyers with wing folding capability also demonstrate superior performance, such as flight endurance, compared to those that flap but do not fold.

In the present patent application, wing folding refers to the additional rotation of the outboard wing section (handwing) relative to inboard wing section (armwing) in the stroke plan. This differs from the planar protraction/retraction of wings along the wingspan, which has also been referred to as wing folding.

In some cases, bats fold their wings so much during upstroke. and the two wingtips touch and clap. This phenomenon occurs not only in multiple bat species, but also in small birds that hover. Both frontal and parasagittal plane PIV measurements were conducted during hovering flight of these birds, and a coherent vortex ring is visible as a result of ventral wing clapping. Lift is estimated from the circulation of this vortex ring during downstroke, under the assumption of an aerodynamically passive upstroke. The reconstructed lift, however, explains about 80% of weight support.

To assess the role of the folding motion on flapping flight, we designed and built a three degrees-of freedom robotic flapper, referred to herein as "Flapperoo," in which both flapping and folding motion are programmable. As is described below, a flapping motion is produced by a four-bar linkage with set amplitude (central pattern generator)— crank rotates continuously; a folding motion is produced by a timing-belt with spool, driven reciprocally; and a twisting motion is produced by a string-based Bowden cable, pitching actuation from wing-tip—reciprocally driven. In one embodiment, the three motions coordinated and programmed in MATLAB® from The Mathworks with a Galil controller. Wing folding and twisting are critical kinematics in lift and thrust generation. Wing folding and twisting work in synergy by alleviating negative lift during late upstroke, and producing more thrust in throughout cycle.

This bio-inspired device allows direct measurement of force and power in a manner that is not possible from animals. The mechanism is composed of two four-bar linkages, driven by two servomotors, in which one controls wing flapping, a movement of the "armwing", and the other controls wing folding, a movement of the "handwing" relative to the armwing.

Figure 1:
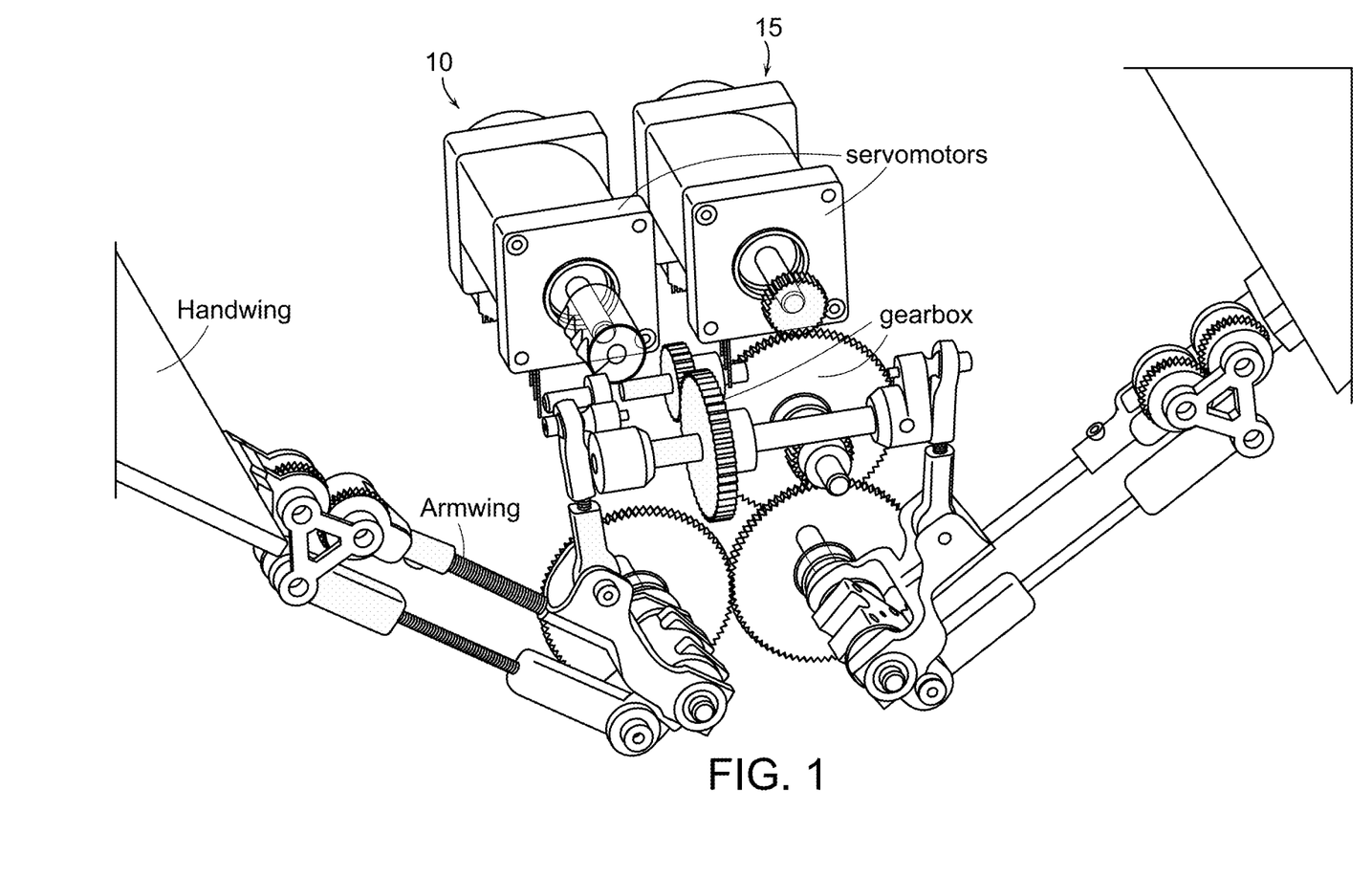
FIG. 1 illustrates an exemplary three degrees-of freedom robotic flapper.

More specifically, as shown in FIG. 1, a flapping motion 10 is realized by a four-bar linkage mechanism. A crank rotates continuously in one direction to pull/push the ball link (coupler), causing the armwing (rocker) to oscillate up and down; an angle between the rocker and the horizontal plane is denoted as the flapping angle $\phi$. To fold the handwing 15, an independent crank is driven reciprocally, dragging a coupler to move in and out. This motion pivots a spur gear (planet gear) on the rocker (carrier) to rotate against a fixed gear mounted on the armwing (sun gear, black), so that the folding angle is amplified. The handwing is fixed to the spur gear, and the angle it makes relative to the armwing is the wing folding angle, denoted as $\theta$. The folding of wings begin at $t/T=\frac{1}{3}$ of a cycle, in the downstroke, and is sinusoidal.

In one embodiment, the wing ribs are laser-cut flat balsa wood strips with a chord length of c=200 mm, and a thickness of 5 mm. The equally-spaced ribs are glued onto a 200 mm carbon-rod spar before being covered with rip-stop kite-cloth fabric. The handwing and armwing are equal in length. The wing assembly weighs 10-grams. To isolate the effect of handwing structure, the skeletal armwing is not covered with fabric, and is 100 mm in length.

The flapping and folding movements are actuated by two brushless rotary servomotors with integrated encoders (BE163CJ-NFON, Parker Hannifin Corp., Rohnert Park, CA), controlled by a servo controller (Accelera DMC-4060, Galil Motion Control, Rocklin, CA). The motors are controlled using software, and operate in 'PVT' mode, where a user defines a list of target positions and velocities at a series of defined times. The controller will then move the motor through a profile that reaches each target position at the target time while moving at the target velocity.

The flapping motor is programmed to execute a constant speed rotation. A testing frequency of 3 Hz was used for all data reported here. The folding motor was programmed to start the fold motion at $t/T=\frac{1}{3}$ and to end at $t/T=1$. Due to the coaxial nature of the rocker during flapping and the crank during folding, friction will cause one to rotate with the other, and thus even for the no folding-case ($\theta$ 0=0), we drive folding at a low level to counter this friction at a non-zero amplitude. This small base offset is added to all other cases.

Figure 2:
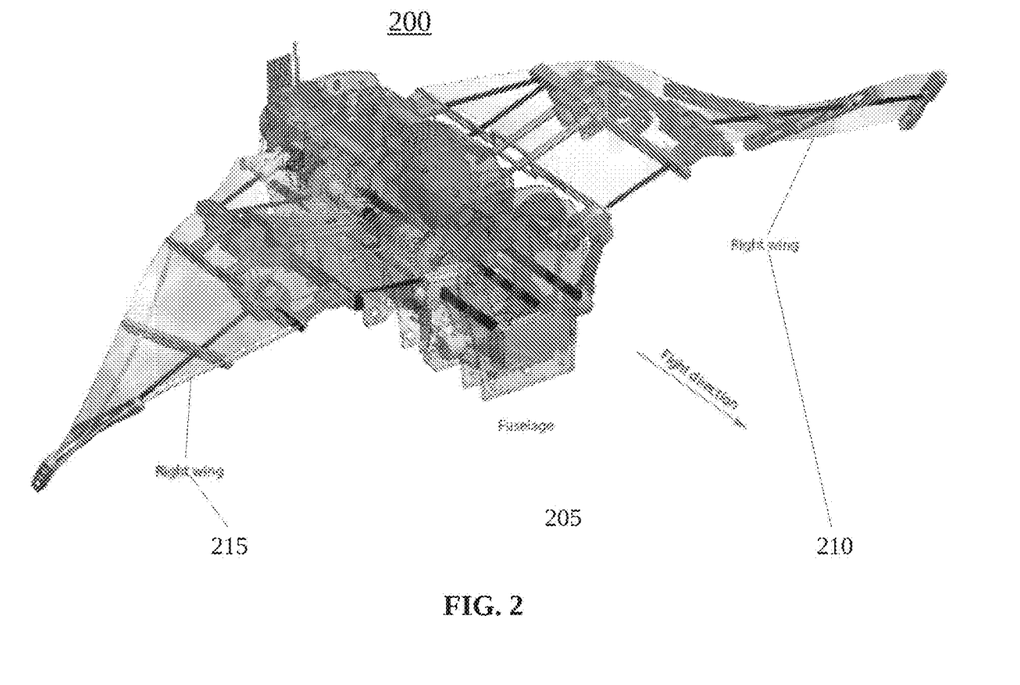
FIG. 2 illustrates a three degrees of freedom flapping wing mechanism.

In FIG. 2, a three degrees of freedom flapping wing mechanism schematics are illustrated. An exemplary flapping wing robot 200 includes a fuselage 205 that houses motors, driving trains, and so forth, and a left wing 210 and a right wing 215 that performs wing flapping, twisting and folding motion.

Figure 3:
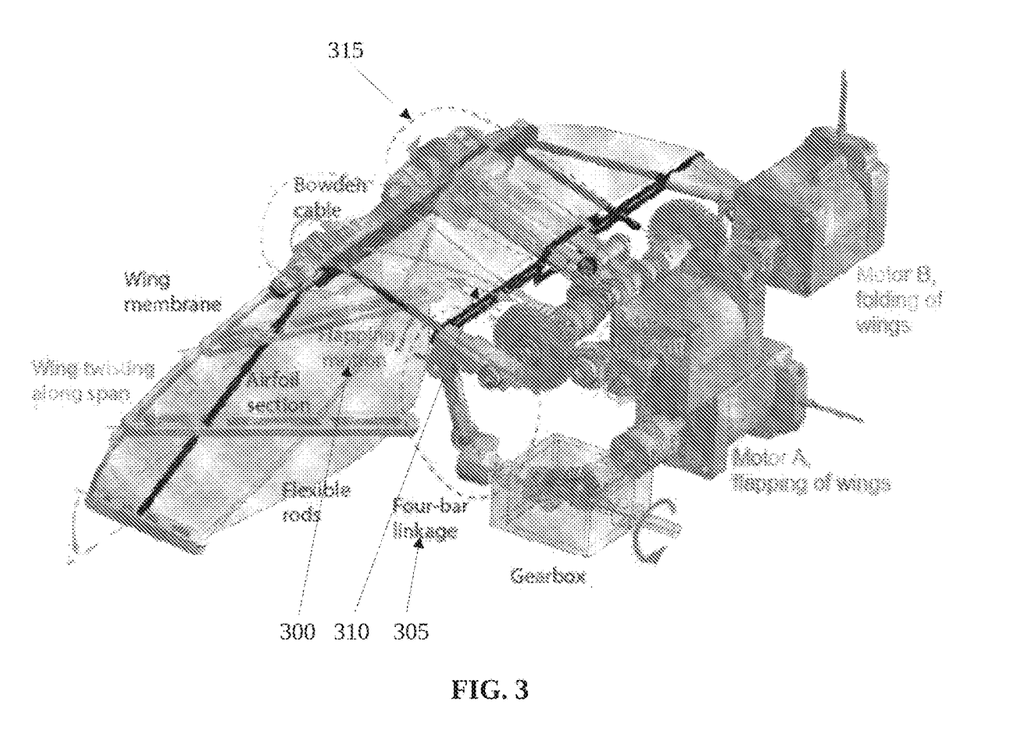
FIG. 3 illustrates simplified mechanisms and right wing actuation.

In FIG. 3, simplified mechanisms and the right wing actuation are illustrated. The flapping motion 300 is driven by a four-bar linkage mechanism 305. The motor spins continuously in one direction, which raises up and pulls down the entire wing. The twisting motion 310 is actuated by a Bowden cable mechanism. A wing folding 315 is realized by a timing belt transmission, where the outboard portion of the wing is fixed with the spool, and rotates with respect to an inner portion of the wing as depicted.

Figure 4:
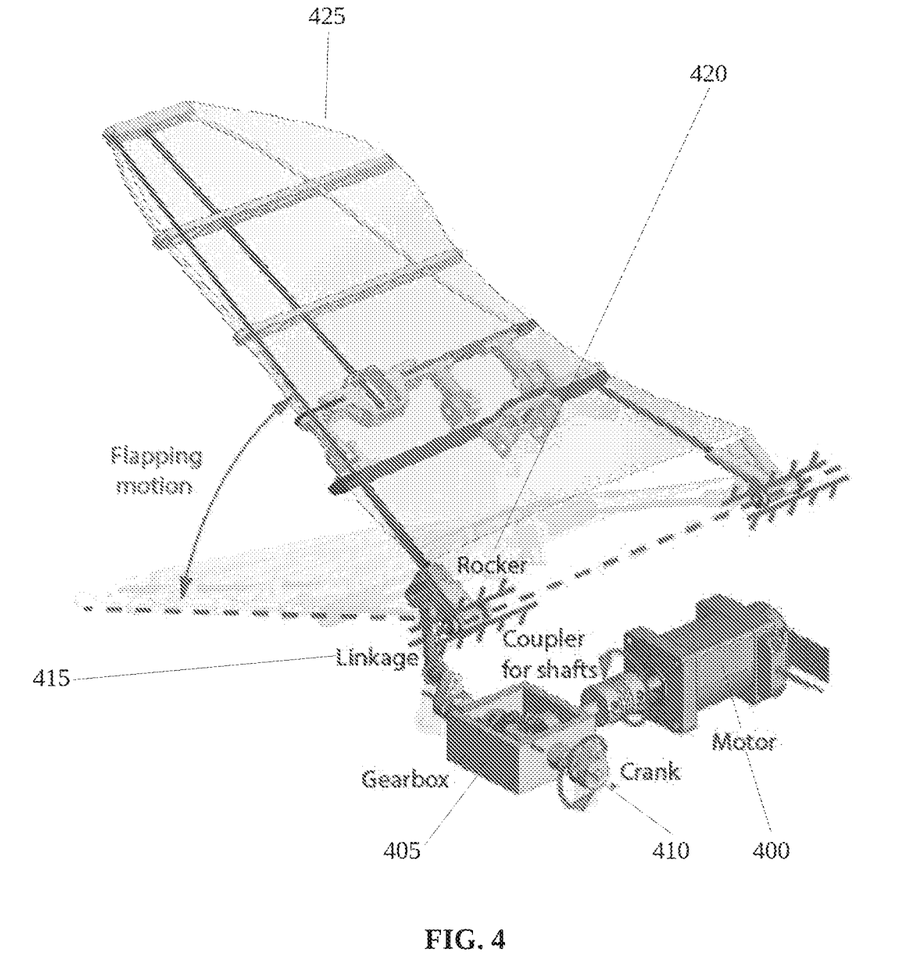
FIG. 4 illustrates a close-up view of an exemplary flapping motion power transmission.

In FIG. 4, a close-up view of an exemplary flapping motion power transmission is illustrated. A motor 400 is connected to a gearbox 405 through a coupler 410, and spins continuously in one direction. The rotating crank then pulls down and raises up a ball-link linkage 415. This linkage 415 is connected to a rocker 420 that is fixed with the wing 425. Thus, the rotation of the rocker 420 becomes the flapping of wings.

Figure 5:
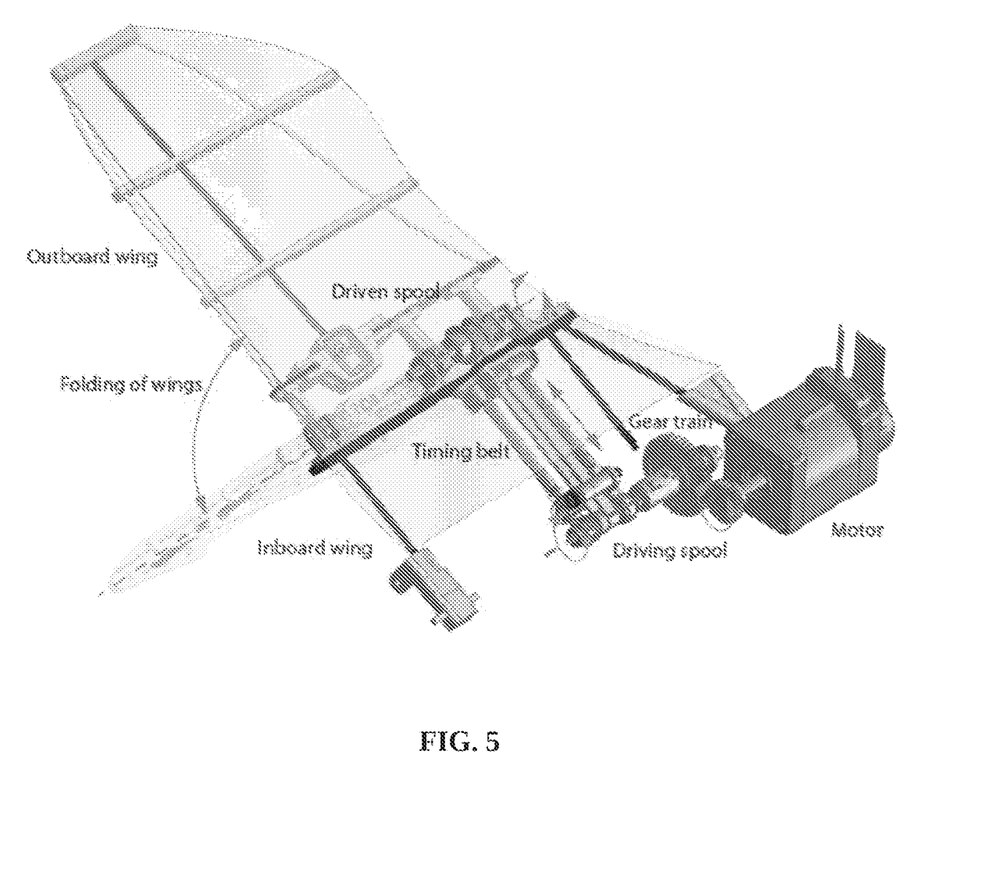
FIG. 5 illustrates exemplary wing folding mechanism schematics.

In FIG. 5, exemplary wing folding mechanism schematics are illustrated. Here, the motor outputs reciprocal motion that rotates the driving spool back and forth. Through the transmission of the timing belt, the driven spool sits in the junction between in- and outboard wing, and would then rotate the outboard wing with respect to its inner portion. This folding of the wing is decoupled with the flapping motion described with respect to FIG. 4 above.

Figure 6:
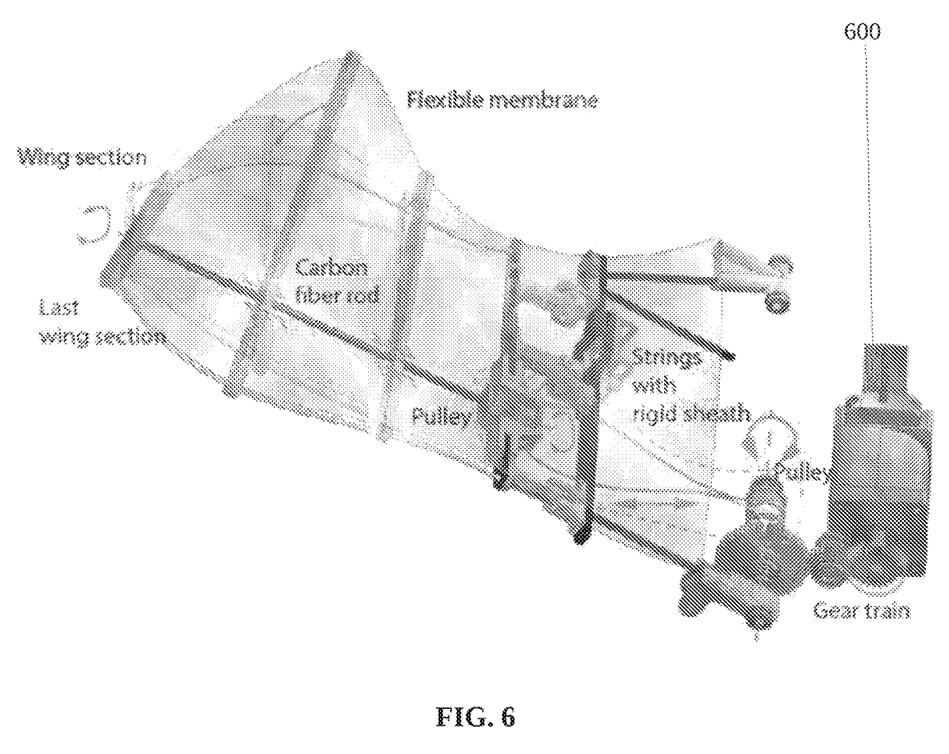
FIG. 6 illustrates exemplary twisting of wings schematics.

In FIG. 6, exemplary twisting of wings schematics are illustrated. Here, a third motor 600 is used to deliver the wing twisting, which rotates reciprocatively, and through the antagonistic strings pulling and releasing, the last wing section pitches up and down. Connected with flexible rods, the second from last wing section would follow, but with with a smaller angle—and the third section with an even smaller degree. This difference in pitching angle is effectively wing twisting.

Below are three examples (or use cases) that outline how the three motions of wings, namely, wing twisting, folding, and flapping may work together in a controlled manner to meet lift and thrust demand.

When taking off, or climbing flight, the body of the robot will pitch up, and the three motions work together to achieve high lift and low thrust. In terms of how to drive the mechanism, the amplitude of the flapping (up-and-down of the inboard section of the wing) will always be fixed to provide a rhythm, around degrees, and it functions as a central pattern generator typically found in animals. To maximize lift, the amplitude of folding is controlled to be max, around 75 degrees, or until the two wingtips would almost meet under the body (ventral side) to affect the air jet (more lift). At this phase, wing twisting is also actuated to minimize negative lift felt during upstroke of the wings, the amplitude of which would be around 90 degrees. The upstroke of the wings should also produce large positive lift due to large wing twisting angles.

After taking off, during cruise condition, the body needs to be better streamlined to reduce drag (or small pitch angle). The lift needs only to balance weight and thrust to balance the drag forces. The flapping motion is still set around degrees. And with headwind, the robot does not need to work as hard to generate lift, so the wing folding degrees is now a variable to choose, and the main purpose of it might be minimizing negative lift, so no more power is used than necessary (e.g., there is no need to generating extra lift through wing clapping). The twisting of wings would be actuated throughout the stroke to orient the wings to produce thrust.

During landing or more generally the descending flight, which is the reverse of taking off. The body of the robot will start to pitch upward, and the three wings would work together to deliver lift just under the weight, but with large drag that slows the vehicle. In this instance, the body is almost vertically oriented, and the stroke plane (the plane where flapping happens) will become almost horizontal, still with a degrees amplitude. The wing folding amplitude would again be large to damp out the streamwise inertia (possibly clapping to generate more negative thrust this time), while providing enough lift so the robot will not fall uncontrollably. The wing twisting would be pronounced during upstroke, such that the ventral side of the wing would almost facing upward.

In all the cases mentioned above, the frequency of motions may be adaptive as needed, but all three motions will be synchronized with each other.

Figure 7:
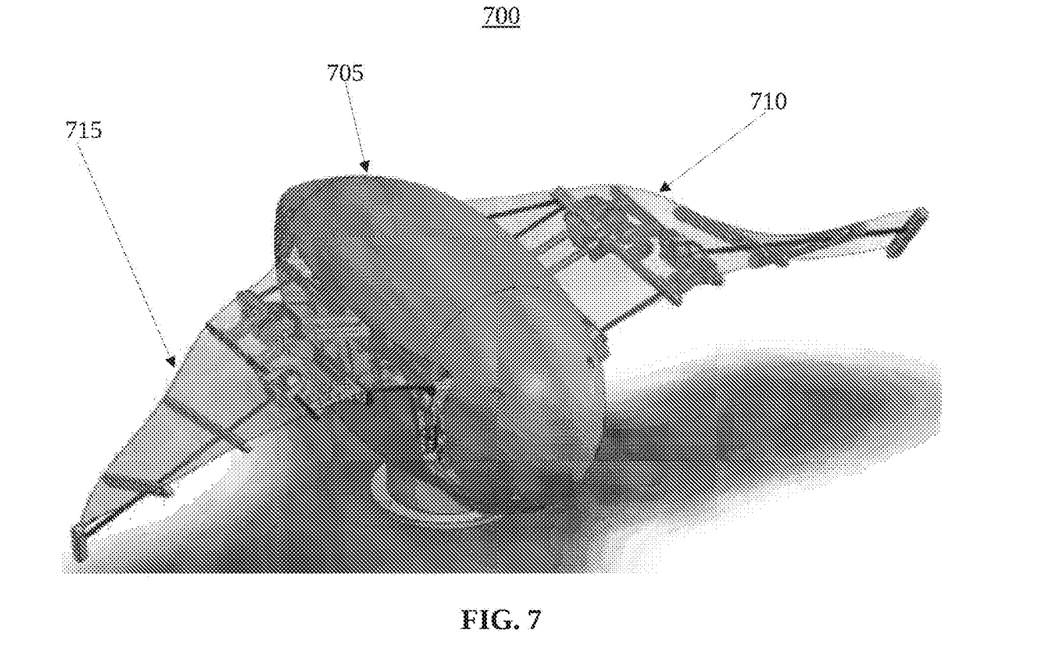
FIG. 7 illustrates an exemplary bio-inspired flapping wing/fin robot.

In FIG. 7, an exemplary bio-inspired flapping wing/fin robot 700 is illustrated. The bio-inspired flapping wing/fin robot 700 includes a fuselage 705, a left wing 710 and a right wing 715.

Figure 8:
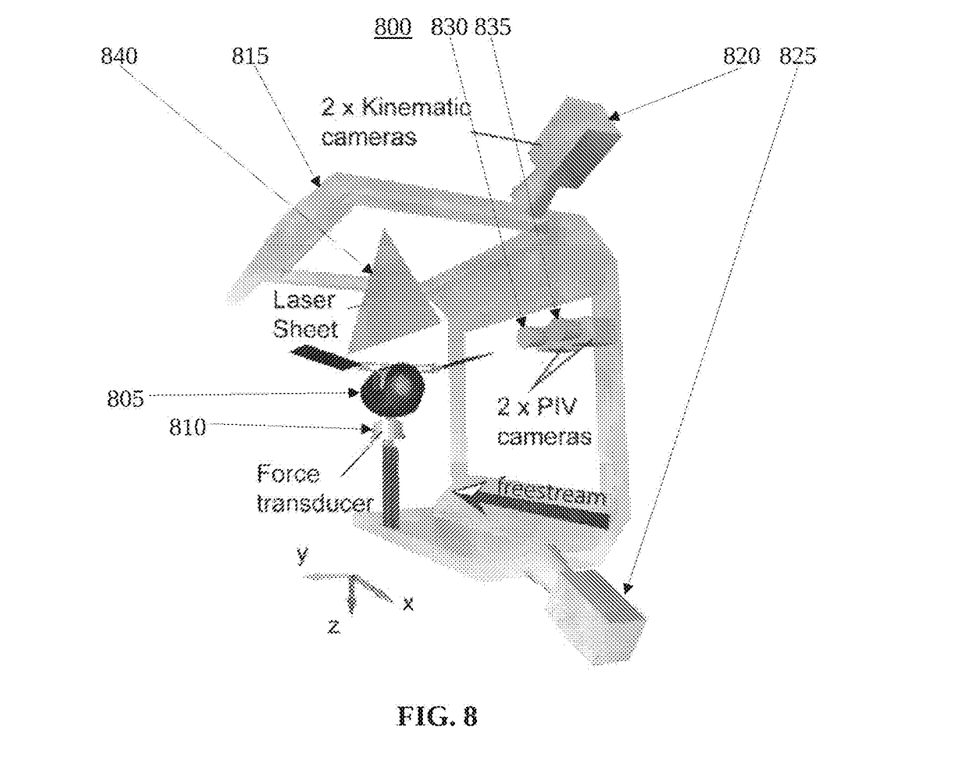
FIG. 8 illustrates an exemplary experimental setup.

In FIG. 8, an exemplary experimental setup 800 is illustrated with an exemplary bio-inspired flapping wing/fin robot 805 positioned within, resting on a force transducer 810. The setup 800 includes an enclosure 815, two Kinematic cameras 820, 825, two particle image velocimetry (PIV) cameras 830, 835 and a laser sheet 840.

Figure 9:
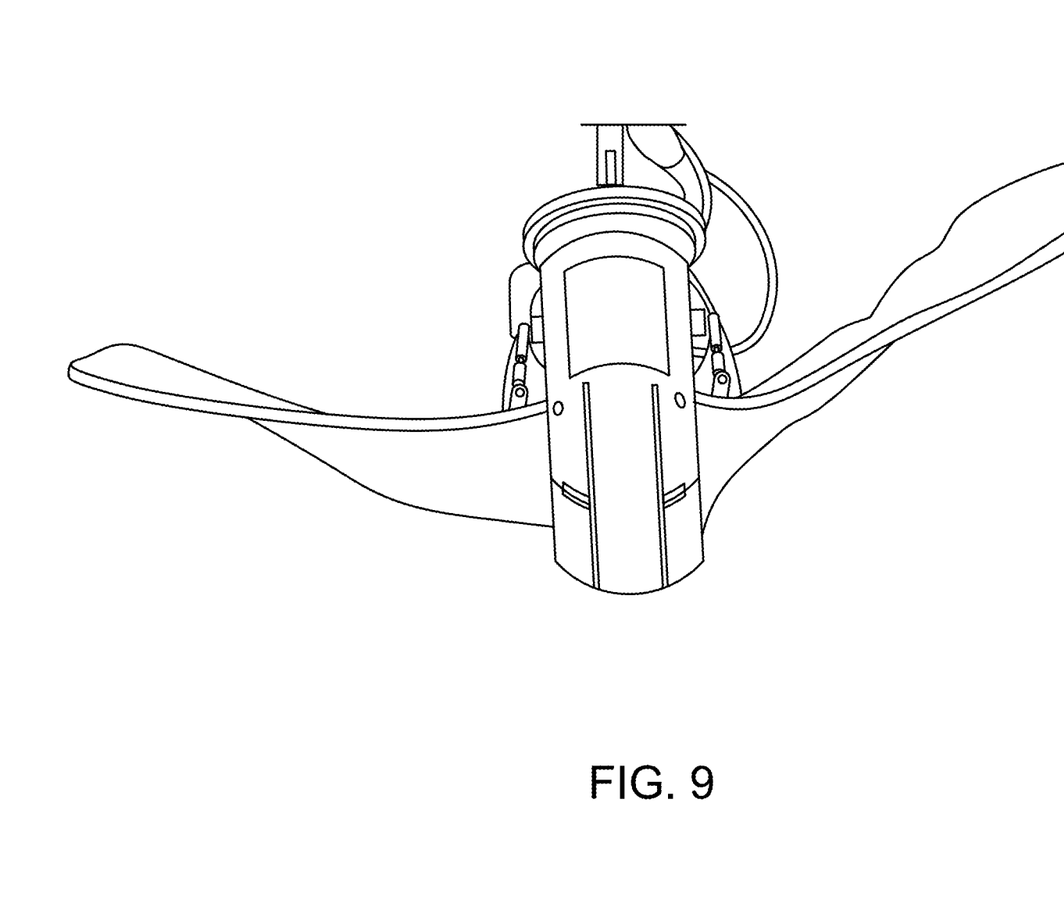
FIGS. 9-11 illustrate a series of brief snapshots of an exemplary wing in a cycle of motion.
Figure 10:
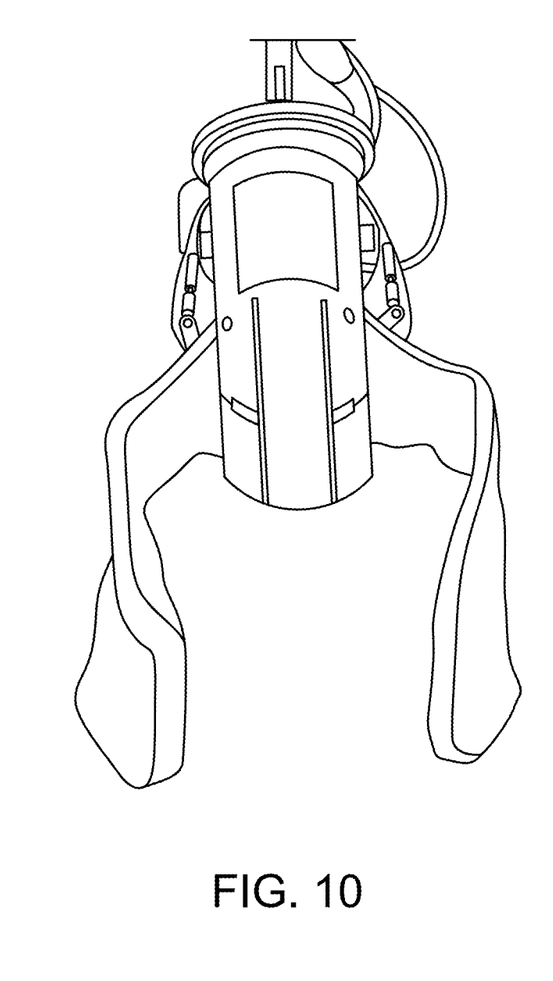
Figure 11:
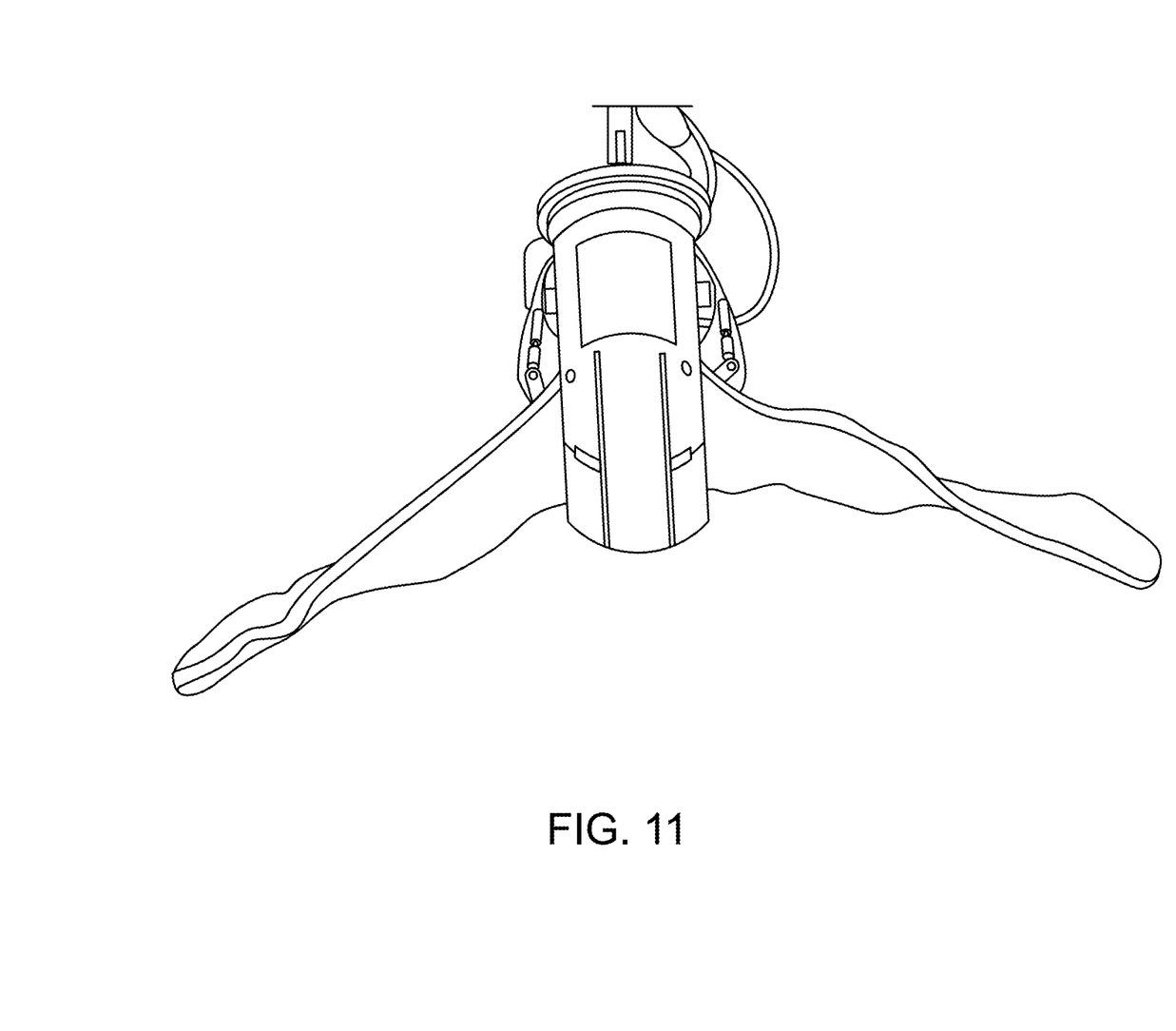

FIGS. 9, 10, and 11 show a series of brief snapshots of an exemplary wing in a cycle of motion. As illustrated, the exemplary wing performs a wing flapping motion, a wing twisting motion and a wing folding motion which work in synergy.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A three degrees-of freedom robotic flapper comprising:
a fuselage, the fuselage housing motors and driving trains;
a left wing attached to the fuselage; and
a right wing attached to the fuselage, the left wing and the right wing configured to perform a wing flapping motion, a wing twisting motion and a wing folding motion, the wing twisting motion actuated by a Bowden cable.

2. The three degrees-of freedom robotic flapper of claim 1 wherein the left wing comprises:
a handwing; and
an armwing.

3. The three degrees-of freedom robotic flapper of claim 2 wherein the right wing comprises:
a handwing; and
an armwing.

4. The three degrees-of freedom robotic flapper of claim 3 wherein the motors and driving trains housed in the fuselage include two four-bar linkages, driven by two servomotors, in which one of the two servomotors controls a wing flapping movement of the armwings of the left wing and the right wing, and the other of the two servomotors controls a wing folding movement of the right wing handwing relative to the right wing armwing and the left wing handwing relative to the left wing armwing.

5. The three degrees-of freedom robotic flapper of claim 4 wherein the wing flapping motion is driven by the four-bar linkage mechanism configured to spin the motor continuously in one direction, which raises up and pulls down the entire wing.

6. The three degrees-of freedom robotic flapper of claim 5 wherein the wing folding motion is realized by a timing belt transmission, where an outboard portion of the wing is fixed with a spool, and rotates with respect to an inner portion of the wing.

7. The three degrees-of freedom robotic flapper of claim 5 wherein a rotating crank is configured to pull down and raise up a ball-link linkage, the ball-link linkage is connected to a rocker that is fixed with the wing.

8. The three degrees-of freedom robotic flapper of claim 6 wherein the motor outputs reciprocal motion configured to rotate a driving spool back and forth; and
through a transmission of the timing belt, the driven spool sits in a junction between in- and outboard wing that rotates an outboard wing with respect to its inner portion.

9. The three degrees-of freedom robotic flapper of claim 4 wherein a third motor is used to deliver the wing twisting configured to rotate reciprocatively, and through an antagonistic strings pulling and releasing, a last wing section pitches up and down, connected with flexible rods, a second from last wing section would follow, but with a smaller angle, and a third section with an even smaller degree.

10. The three degrees-of freedom robotic flapper of claim 4 wherein a first servomotor controls wing flapping and a movement of an armwing.

11. The three degrees-of freedom robotic flapper of claim 10 wherein a second servomotor controls wing folding and a movement of a handwing relative to the armwing.

12. The three degrees-of freedom robotic flapper of claim 11 wherein a third servomotor controls wing twisting and a varying pitching angle of the wing section along the wingspan.

13. A method of flapping wings on a robotic platform comprising:
providing a fuselage housing motors and driving trains;
providing a left wing attached to the fuselage;
providing a right wing attached to the fuselage; and
performing a wing flapping motion, a wing twisting motion and a wing folding motion, the wing twisting motion is actuated by a Bowden cable, the wing folding motion and the wing twisting working in synergy by alleviating negative lift during a late upstroke, and producing more thrust in a throughout cycle.

14. The method of flapping wings on a robotic platform of claim 13 wherein, when taking off climbing flight, the fuselage pitches up, and the wing flapping motion, the wing twisting motion and the wing folding motion work together to achieve high lift and low thrust.

15. The method of flapping wings on a robotic platform of claim 14 wherein, to maximize lift, an amplitude of the folding motion is controlled to be approximately 75 degrees, or until a left wing tip and a right wing tip almost meet under the fuselage to affect an air jet.

16. The method of flapping wings on a robotic platform of claim 15 wherein further comprising actuating the wing twisting motion to minimize negative lift felt during an upstroke of the right wing and the left wing, producing large positive lift due to large wing twisting angles.

17. The method of flapping wings on a robotic platform of claim 13, wherein during cruise condition, the flapping motion is set to approximately 50 degrees, and a twisting of the right wing and the left wing actuated throughout a stroke to orient the right wing and the left wing to produce thrust.

18. The method of flapping wings on a robotic platform of claim 13, wherein during a descending flight the wing twisting motion is pronounced during upstroke such that a ventral side of the right wing and the left wing is almost facing upward.

\* \* \* \* \*